US 11,282,393 B2

(12) United States Patent
Yun et al.

(10) Patent No.: US 11,282,393 B2
(45) Date of Patent: Mar. 22, 2022

(54) METHOD, SYSTEM, AND NON-TRANSITORY COMPUTER READABLE MEDIUM FOR PROVIDING PICKUP PLACE

(71) Applicant: LINE Plus Corporation, Seongnam-si (KR)

(72) Inventors: KiYoung Yun, Seongnam-si (KR); Changha Kim, Seongnam-si (KR); Namyoon Kim, Seongnam-si (KR); Dae Hyeon Lee, Seongnam-si (KR); Cheol Hyun Park, Seongnam-si (KR); Ky-Yong Sim, Seongnam-si (KR); Hyesang Yu, Seongnam-si (KR)

(73) Assignee: Line Plus Corporation, Gyeonggi-do (KR)

( * ) Notice: Subject to any disclaimer, the term of this patent is extended or adjusted under 35 U.S.C. 154(b) by 137 days.

(21) Appl. No.: 16/239,832

(22) Filed: Jan. 4, 2019

(65) Prior Publication Data
US 2019/0206259 A1    Jul. 4, 2019

(30) Foreign Application Priority Data
Jan. 4, 2018    (KR) .................. 10-2018-0001379

(51) Int. Cl.
*G08G 1/00*    (2006.01)
*G01C 21/34*    (2006.01)
(Continued)

(52) U.S. Cl.
CPC ......... *G08G 1/202* (2013.01); *G01C 21/3438* (2013.01); *G01C 21/3676* (2013.01);
(Continued)

(58) Field of Classification Search
CPC ........ G08G 1/202; H04W 4/024; H04W 4/29; H04W 4/02; H04W 4/021; G01C 21/3438;
(Continued)

(56) References Cited

U.S. PATENT DOCUMENTS

| 2014/0039784 A1* | 2/2014 | Millspaugh | ............ G08G 1/202 |
| | | | 701/300 |
| 2017/0169535 A1* | 6/2017 | Tolkin | .............. G06Q 10/06311 |

(Continued)

FOREIGN PATENT DOCUMENTS

| JP | 2008-111842 A | 5/2008 |
| KR | 10-2002-0007269 A | 1/2002 |

(Continued)

*Primary Examiner* — Mahmoud S Ismail
*Assistant Examiner* — Gabriel Anfinrud
(74) *Attorney, Agent, or Firm* — Harness, Dickey & Pierce, P.L.C.

(57) ABSTRACT

Disclosed is a method, system, and non-transitory computer-readable storage medium for providing a pickup location. The pickup service method executable on a computer system, including displaying, by the at least one processor, one or more pickup candidate locations corresponding to a location associated with a user of an electronic device, on a map screen including the location, providing, by the at least one processor, guidance information on a pickup candidate location, which is selected by the user from among the one or more pickup candidate locations, on the map screen, and transmitting, by the at least one processor to a server, a pickup request including a final pickup candidate location that is selected by the user from among the one or more pickup candidate locations displayed on the map screen as a pickup location may be provided.

20 Claims, 13 Drawing Sheets

(51) Int. Cl.
   *G01C 21/36*     (2006.01)
   *H04W 4/021*     (2018.01)
   *H04W 4/029*     (2018.01)
   *H04W 4/024*     (2018.01)
   *H04L 67/52*     (2022.01)
   *H04W 4/02*      (2018.01)
   *G06Q 50/30*     (2012.01)

(52) U.S. Cl.
   CPC .......... *G01C 21/3682* (2013.01); *H04L 67/18* (2013.01); *H04W 4/02* (2013.01); *H04W 4/021* (2013.01); *H04W 4/024* (2018.02); *H04W 4/029* (2018.02); *G06Q 50/30* (2013.01)

(58) Field of Classification Search
   CPC . G01C 21/3676; G01C 21/3682; H04L 67/18; G06Q 50/30
   See application file for complete search history.

(56) References Cited

U.S. PATENT DOCUMENTS

| | | | |
|---|---|---|---|
| 2017/0262802 A1* | 9/2017 | Swanson | H04W 4/02 |
| 2019/0063935 A1* | 2/2019 | Badalamenti | G01C 21/3647 |
| 2019/0186943 A1* | 6/2019 | Dubielzyk | G01C 21/3438 |
| 2019/0205355 A1* | 7/2019 | Moore | G06Q 10/06311 |

FOREIGN PATENT DOCUMENTS

| | | |
|---|---|---|
| KR | 10-2015-0133349 A | 11/2015 |
| KR | 10-2017-0036570 A | 4/2017 |

\* cited by examiner

METHOD, SYSTEM, AND NON-TRANSITORY COMPUTER READABLE MEDIUM FOR PROVIDING PICKUP PLACE

CROSS-REFERENCE TO RELATED APPLICATION(S)

This U.S. non-provisional application claims the benefit of priority under 35 U.S.C. § 119 to Korean Patent Application No. 10-2018-0001379 filed on Jan. 4, 2018, in the Korean Intellectual Property Office (KIPO), the entire contents of which are incorporated herein by reference.

BACKGROUND

Field

One or more example embodiments relate to methods, systems, and/or non-transitory computer readable media for providing location information of a place for pickup.

Description of Related Art

Location-based pickup services, such as call-taxi, car sharing, and delivery service, are popular. A call-taxi service is one of such pickup services, and enables a user and a driver to share location information without making a separate call using a dedicated application of a mobile terminal, and accordingly enables the user to use information and a service of a desired call-taxi.

SUMMARY

One or more example embodiments provide methods, systems, and/or non-transitory computer readable media that are capable of selecting an exact location for pickup.

One or more example embodiments also provide methods, systems, and/or non-transitory computer readable media that are capable of guiding a route to a pickup location.

One or more example embodiments also provide methods, systems, and/or non-transitory computer readable media that are capable of providing arrival information from a corresponding candidate location to a destination for each available pickup candidate location.

According to an aspect of at least one example embodiment, a pickup service method executable on a computer system, which includes a memory configured to store computer-readable instructions and at least one processor configured to execute the computer-readable instructions, includes displaying, by the at least one processor, one or more pickup candidate locations corresponding to a location associated with a user of an electronic device, on a map screen including the location, providing, by the at least one processor, guidance information on a pickup candidate location, which is selected by the user from among the one or more pickup candidate locations, on the map screen, and transmitting, by the at least one processor to a server, a pickup request, the pickup request including a final pickup candidate location that is selected by the user from among the one or more pickup candidate locations displayed on the map screen as a pickup location.

The guidance information may be provided by referring to a database, which is included in or associated with the server and is configured to store a location and a photo of a desired pickup candidate location around each point of a point of interest (POI) level.

The displaying may include displaying the one or more pickup candidate locations within a desired radius from the location on the map screen by referring to the database.

The providing may include providing photo information of the pickup candidate location as the guidance information on the pickup candidate location.

The providing may include providing route guidance information from the location to the pickup candidate location as the guidance information on the pickup candidate location.

The pickup service method may further include providing, by the at least one processor, arrival information from the pickup candidate location to a destination.

The pickup service method may further include displaying, by the at least one processor, one or more pickup directions corresponding to a road on the map screen and selectable in response to the location being on the road or adjacent to the road.

The displaying one or more pickup directions may include providing a user interface for selecting, as the pickup direction, a single direction from among one or more passage allowing directions, which are one or more from among the one or more pickup directions that allow passage to the road, based on the location and road information on the road.

The pickup service method may further include providing, by the at least one processor, arrival information to a destination along the pickup direction.

The pickup service method may further include providing, by the at least one processor, at least one of travel distance or route guidance information from the location to the pickup candidate location along the pickup direction.

According to an aspect of at least one example embodiment, there is provided a non-transitory computer-readable storage medium storing instructions that, when executed by a processor, cause the processor to perform the aforementioned pickup service method.

According to an aspect of at least one example embodiment, a computer system including a memory configured to store computer-readable instructions; and at least one processor configured to execute the computer-readable instructions. The at least one processor may be configured to display a location associated with a user of an electronic device and one or more pickup candidate locations corresponding to the location on a map screen, provide guidance information on a pickup candidate location, which is selected by the user from among the one or more pickup candidate locations, on the map screen, and transmit, to a server, a pickup request, the pickup request including a final pickup candidate location that is selected as a pickup location by the user from among the one or more pickup candidate locations displayed on the map screen.

Further areas of applicability will become apparent from the description provided herein. The description and specific examples in this disclosure are intended for purposes of illustration only and are not intended to limit the scope of the present disclosure.

BRIEF DESCRIPTION OF THE FIGURES

Some example embodiments will be described in more detail with regard to the figures, wherein like reference numerals refer to like parts throughout the various figures unless otherwise specified, and wherein.

Figure 1:
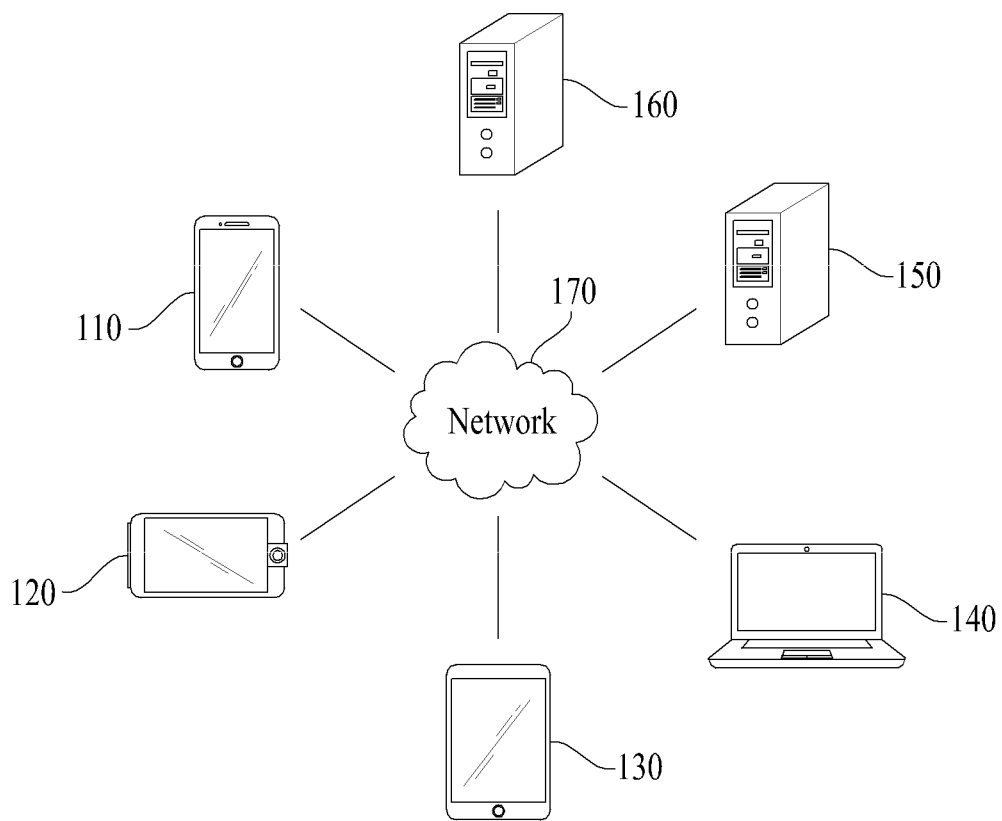
FIG. 1 is a diagram illustrating an example of a network environment according to at least one example embodiment.

It should be noted that these figures are intended to illustrate some characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

One or more example embodiments relate to methods, systems, and/or non-transitory computer readable media for providing pickup location information, and more particularly, to a user interface (UI) configuration for accurately transmitting a pickup location in response to a pickup request.

Some example embodiments disclosed herein may select and display an exact location of a place for pickup, and accordingly may provide improvements in terms of accurate, efficient, and convenient user interfaces.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer system. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates the electronic device 110 in a shape of a smartphone, it is provided as an example only. Here, the electronic device 110 may refer to any type of various physical computer systems capable of communicating with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. For example, the server 150 may provide, as the first service, a service, for example, a pickup service, desired by an application through the application as a computer program installed and executed on the plurality of electronic devices 110, 120, 130, and/or 140, to the plurality of electronic devices 110, 120, 130, and/or 140. As another example, the server 160 may provide, as the second service, a service for distributing a file for installation and execution of the application to the plurality of electronic devices 110, 120, 130, and/or 140.

Figure 2:
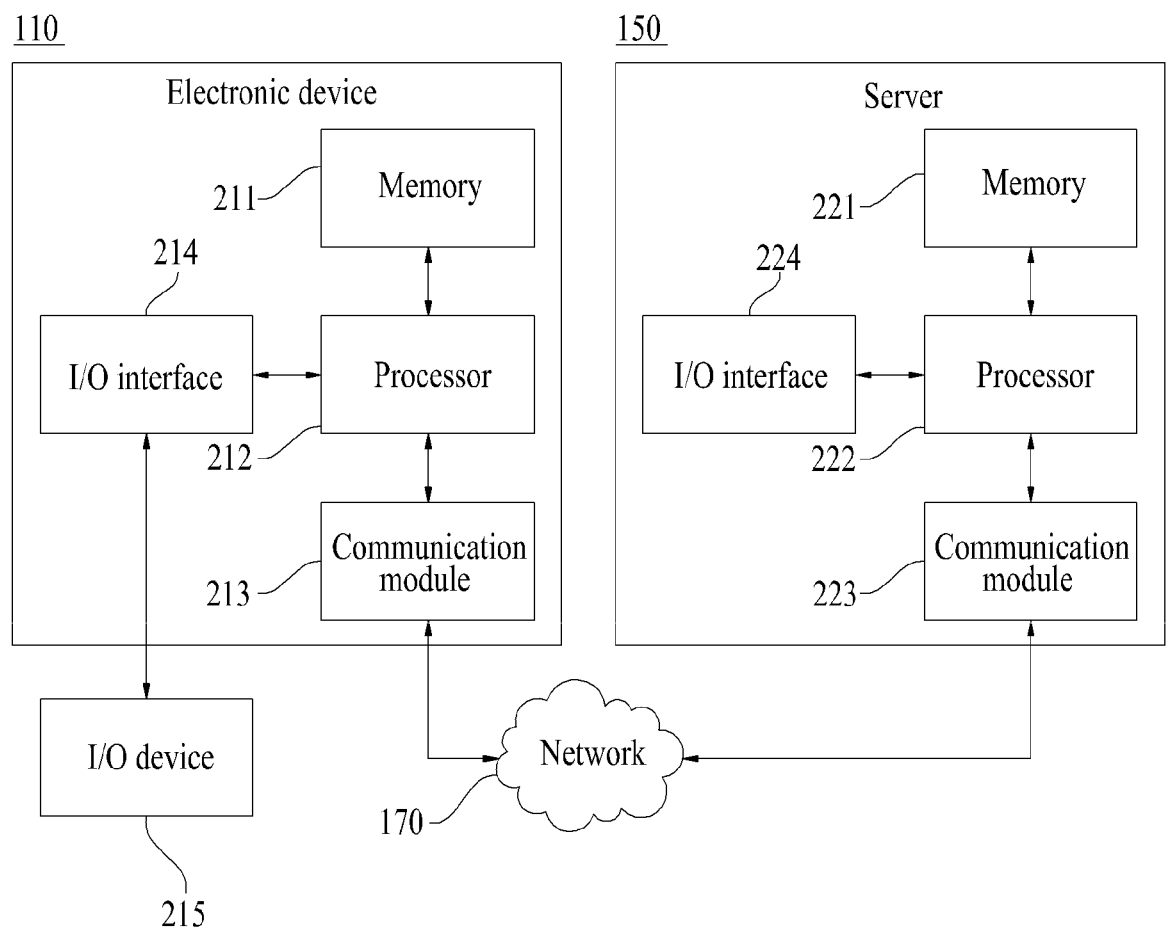
FIG. 2 is a diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device (e.g., random access memory (RAM), read only memory (ROM), a disk drive, a solid state drive (SSD), or a flash memory) as a non-transitory computer-readable storage medium. Here, the permanent mass storage device (ROM, SSD, flash memory, or disk drive) may be included in the electronic device 110 or the server 150 as a permanent storage device separate from the memory 211, 221. Also, an OS or at least one program code, for example, a code for an application for providing a specific service installed on the electronic device 110 or a browser installed and executed on the electronic device 110, may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device (e.g., the memory 211, 221).

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device (e.g., the memory 211) to the server 150 over the network 170 under control of the communication module 213. A control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O device 215. For example, an input device may include, for example, a keyboard, a mouse, a microphone, and/or a camera, and an output device may include, for example, a display, a speaker, and/or a haptic feedback device. As another example, the I/O interface 214 may be a device for interface with an apparatus in which an input function and an output function are integrated into a single function, such as a touchscreen. The I/O device 215 may be configured as a single device associated with the electronic device 110. Also, the I/O interface 224 of the server 150 may be a device used for connection with the server 150 or for interface with a device (not shown) for input or output includable in the server 150. For example, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of components than a number of components shown in FIG. 2. However, there is no need to clearly illustrate many components according to the related art. For example, the electronic device 110 may include at least a portion of the I/O device 215, or may further include other components, for example, a transceiver, a global positioning system (GPS) module, a camera, a variety of sensors, a database (DB), and the like. For example, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, a method and system for selecting and transferring an exact pickup location according to example embodiments will be described.

Herein, the term "pickup service" used herein refers to a type of a service for visiting a place requested by a client and providing a service. Examples of the pickup service may include a call-taxi service, a car sharing service, and a delivery service. They are provided as examples only and various types of pickup services may be applied.

A typical pickup service provides address information of a pickup location and a map screen to a pickup person (e.g., a taxi driver or a delivery person), in response to a user setting a location of a desired place for pickup. However, in many cases, it is difficult to verify an exact location of the place for pickup with the information.

Herein, proposed is a screen configuration capable of selecting and transferring an exact location of a place for pickup. Hereinafter, although the example embodiments are described using a call-taxi as one example of the pickup service, it is provided as an example only and the example embodiments are not limited thereto.

Figure 3:
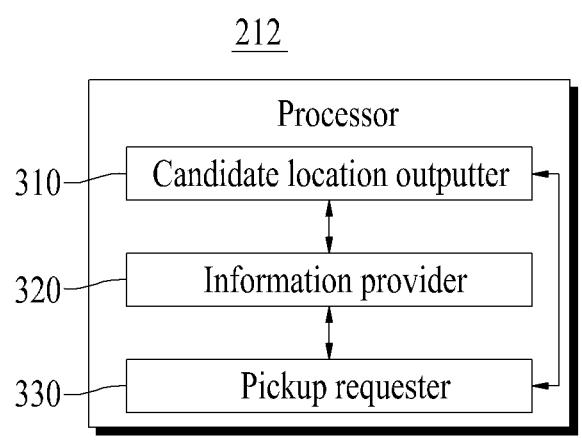
FIG. 3 is a diagram illustrating an example of components includable in a processor of an electronic device according to at least one example embodiment.
Figure 4:
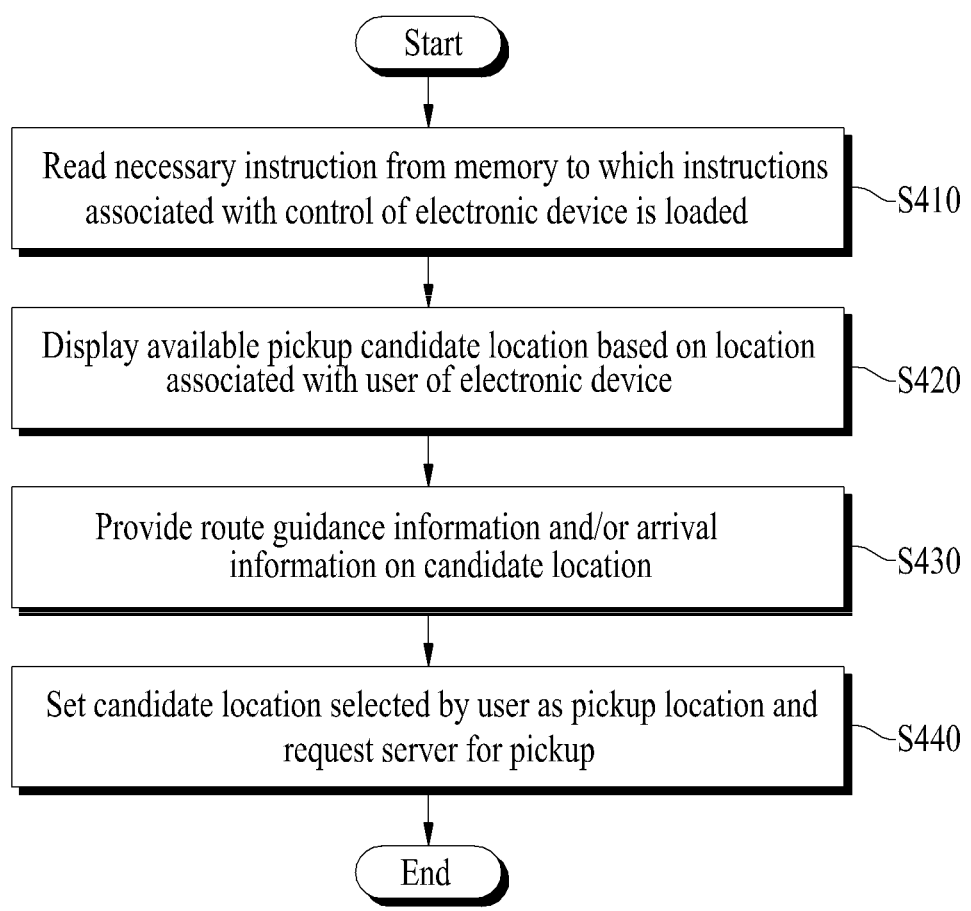
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A pickup service system implemented as a computer may be configured on the electronic device 110 according to the example embodiment. The pickup service system may be configured in a form of an application installed on the electronic device 110 and may provide a location-based pickup service in conjunction with the server 150. Here, the server 150 serves as a platform that provides a pickup service to the plurality of electronic devices 110, 120, 130, and/or 140 that are clients. The server 150 may provide the location-based pickup service in conjunction with the application installed on the electronic devices 110, 120, 130, and/or 140.

The pickup service system configured on the electronic device 110 may perform a pickup service method in response to an instruction provided from the application installed on the electronic device 110. Referring to FIG. 3, to perform the pickup service method of FIG. 4, the processor 212 of the electronic device 110 may include a candidate location outputter 310, an information provider 320, and a pickup requester 330. Depending on example embodiments, the components of the processor 212 may be selectively included in or excluded from the processor 212. Also, depending on example embodiments, the components of the processor 212 may be separate or merged for functional representation of the processor 212.

The processor 212 and the components of the processor 212 may control the electronic device 110 to perform operations S410 through S440 included in the pickup service method of FIG. 4. For example, the processor 212 and the components of the processor 212 may be configured to execute an instruction according to a code of at least one program and a code of the OS included in the memory 211.

Here, the components of the processor 212 may be representations of different functions of the processor 212 that are performed by the processor 212 in response to an instruction, for example, an instruction provided from the application installed on the electronic device 110, provided from a program code stored in the electronic device 110. For example, the candidate location outputter 310 may be used as a functional representation of the processor 212 that controls the electronic device 110 to display available pickup candidate locations on a map in response to the instruction.

Referring to FIG. 4, in operation S410, the processor 212 may read a desired instruction from the memory 211 to which instructions associated with control of the electronic device 110 are loaded. In this case, the read instruction may include an instruction for controlling the processor 212 to perform the following operations S420 through S440.

In operation S420, the candidate location outputter 310 may display one or more available pickup candidate locations based on a location (hereinafter, a user location) associated with a user of the electronic device 110 on a map screen including the location. The server 150 may generate in advance a candidate location database (DB) that stores location information, for example, latitude and longitude coordinates, and photo information of at least one pickup candidate location (hereinafter, a hot pickup point) at which the user may meet taxies for each point of a point of interest (POI) level. In addition to the candidate location DB, the server 150 may generate advance overall information desired to provide a pickup service, for example, a map DB. In response to an instruction provided from an application executed on the electronic device 110, the processor 212 of the electronic device 110 may download desired data from the server 150 at a setting point in time of a pickup location by referring to a DB that is generated in advance on the server 150, or may download, from the server 150, at least a portion of the data stored in the DB generated in advance on the server 150 and may store the downloaded data in a form of a file on the corresponding application. Accordingly, the candidate location outputter 310 may provide the map screen that includes the user location, for example, a current location acquired from the electronic device 110 or a location selected by the user, and may display, on the map screen, the user location and a predetermined (or, alternatively, desired) hot pickup point within a predetermined (or, alternatively, desired) radius from the user location. Here, the map screen may include a user interface (UI) for selecting at least one of hot pickup points as an exact pickup location. That is, the server 150 may construct, as a DB, longitude and latitude coordinates and photos associated with at least one point (e.g., a main POI or a landmark) around which the user may meet taxies for each large building, on a map. In response to a request from the user for a pickup service around a point included in the candidate location DB, the candidate location outputter 310 may display predetermined (or, alternatively, desired) hot pickup points around the corresponding point on the map including the user location so that the user may select an exact location for pickup.

According to some example embodiments, when a location associated with a user of an electronic device 110 is displayed on a map screen that is provided by, for example, a location-based pick service application installed on the electronic device 110, the server 150 may collect relevant information over the network 170, and provide the one or more available pickup candidate locations and associated information (e.g., latitude and longitude coordinates or photo information thereof) at which the user may meet taxies in real time based on the location of the user on the map screen including the user location.

In operation S430, the information provider 320 may provide at least one of guidance information, route guidance information, or arrival information on a hot pickup point selected by the user of the electronic device 110 from among hot pickup points displayed on the map screen including the user location. The information provider 320 may provide details of the hot pickup point. The route guidance information may include information used to guide a route from the user location to the hot pickup point. The information provider 320 may provide guidance information used to find a way to the hot pickup point using, for example, a photo, an indicator with an arrowhead, and/or augmented reality (AR). Further, the information provider 320 may provide arrival information from a corresponding point to a destination set by the user for each hot pickup point present around the user. Here, the information provider 320 may provide arrival information including an estimated time of arrival and estimated fare to the destination based on a distance between each hot pickup point and the destination, and the user may select a pickup location based on the arrival information.

In operation S440, the pickup requester 330 may set, as the pickup location, a final hot pickup point that is selected by the user of the electronic device 110 from among the hot pickup points displayed on the map screen including the user location, and may request the server 150 for the pickup. The pickup request may include location information and photo information on the pickup location of the user (e.g., the hot pickup point), and identification information (e.g., a virtual telephone number) for a call connection with the electronic device 110. For example, the server 150 may periodically collect locations of taxi driver terminals and, in response to receiving a pickup request from the electronic device 110, may connect a call to at least one taxi driver terminal present around a pickup location requested by the user, and may transfer the pickup request of the electronic device 110 to a taxi driver terminal that makes an earliest response to the call. If the user requests a pickup in a large building, a taxi driver may receive information on a hot pickup point selected by the user around the building instead of simply receiving building information, and may verify an exact location of a place for pickup.

Figure 5:
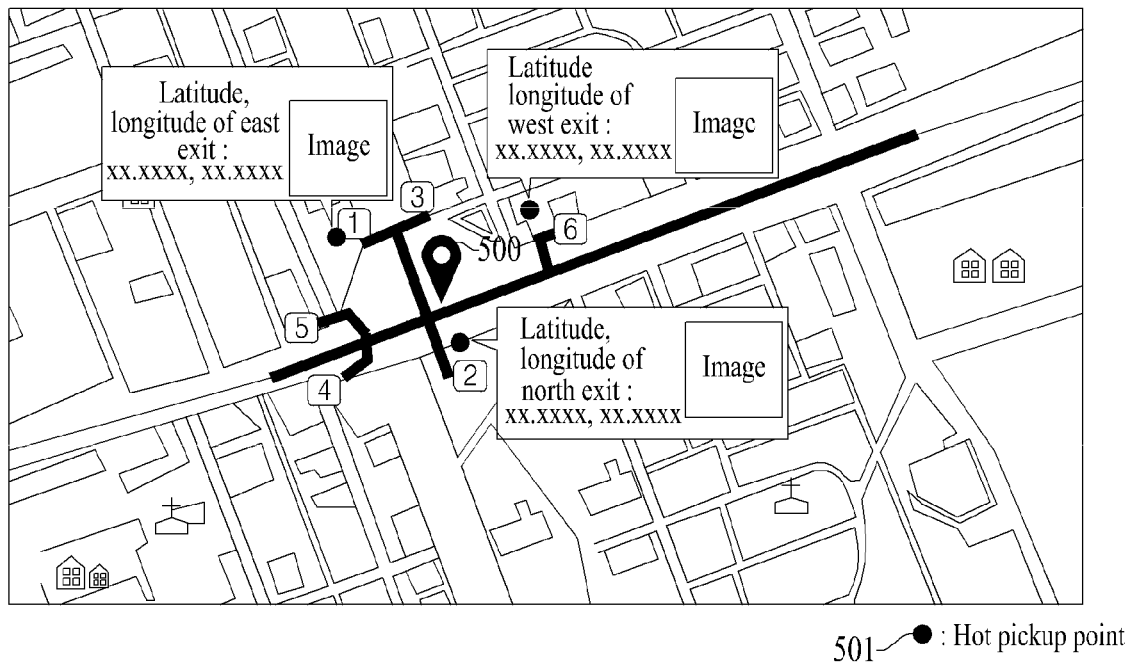
FIG. 5 illustrates an example of a process of generating a candidate location database (DB) according to at least one example embodiment.

FIG. 5 illustrates an example of a process of generating a candidate location DB according to at least one example embodiment.

Referring to FIG. 5, with respect to a main point 500 (e.g., a main POI or a landmark) on a map, the server 150 may generate a candidate location DB that stores locations and photos of one or more hot pickup points 501 at which a user may meet taxies around the main point 500. The hot pickup points 501 may be determined in advance based on floating population, characteristics of adjacent roads, and ease of access to a taxi. The server 150 may store street photos or aerial photos clearly indicating the hot pickup point 501 with latitude and longitude coordinate values. In this manner, to support an environment in which the user may select an exact location of a place for pickup, the server 150 may generate in advance the candidate location DB that stores locations and photos of the one or more hot pickup points 501 determined in advance for each main point 500 on the map.

Figure 6:
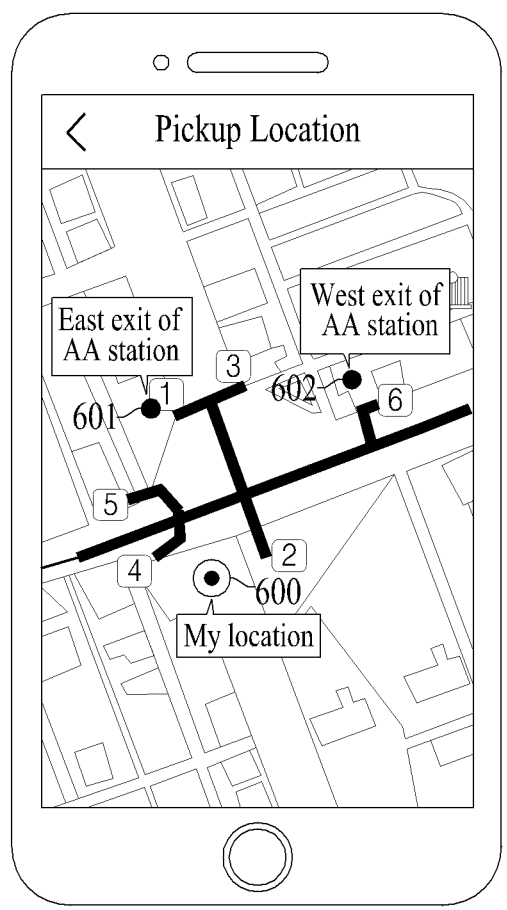
FIGS. 6 through 9 illustrate examples of a process of selecting a pickup location according to at least one example embodiment.
Figure 7:
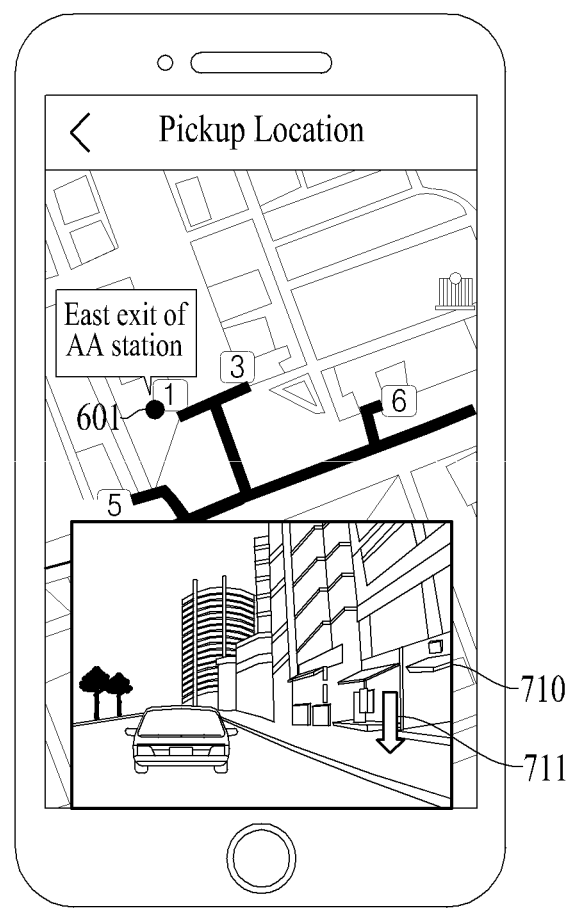
Figure 8:
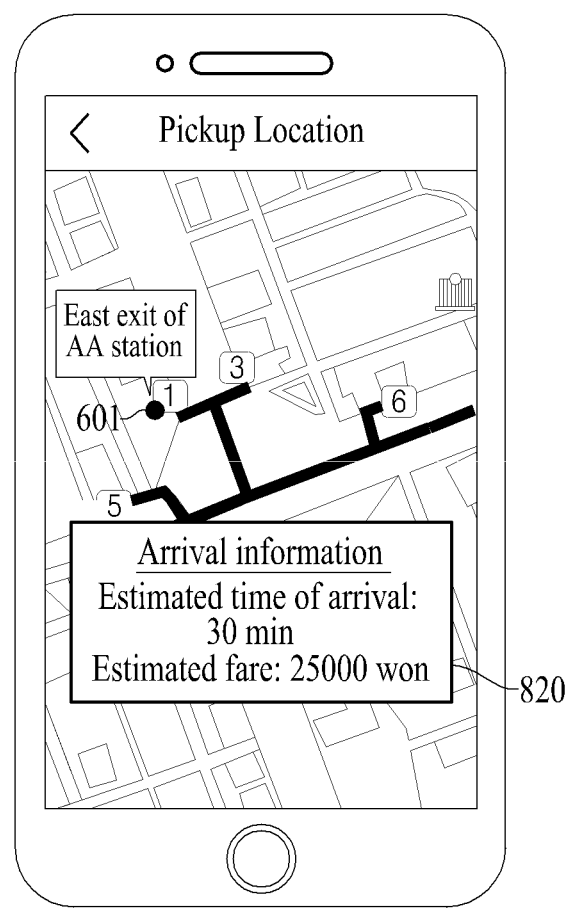

FIGS. 6 through 8 illustrate examples of a process of selecting a pickup location according to at least one example embodiment.

Referring to FIG. 6, the candidate location outputter 310 may provide a map screen including a user location 600 when setting a pickup location, and may display hot pickup points 601 and 602 adjacent to the user location 600 on the map screen. That is, in response to a request from the user for a pickup service around a large building, the candidate location outputter 310 may notify the user of the pickup points 601 and 602 at which the user may meet taxies around the corresponding building. Here, the map screen for setting the pickup location may include a UI capable of selecting one of the hot pickup points 601 and 602.

Referring to FIG. 7, in response to the user selecting the hot pickup point 601 as the pickup location, the information provider 320 may provide guidance information 710 on the hot pickup point 601. Here, the guidance information 710, as details of the hot pickup point 601, may include a street photo or an aerial photo of the hot pickup point 601. An indicator, for example, an indicator with an arrowhead 711 that indicates an actual pickup location may be included in the photo. As another example of the guidance information 710, the information provider 320 may provide route guidance information from the user location 600 to the hot pickup point 601 selected as the pickup location using a street view or an AR.

Referring to FIG. 8, in response to the user selecting the hot pickup point 601 as the pickup location, the information provider 320 may provide arrival information 820 on the hot pickup point 601. Here, the arrival information 820 may include, for example, a distance, an estimated time of arrival, and estimated fare from the hot pickup point 601 to the destination set by the user, as detailed guidance associated with the hot pickup point 601. Because an amount of time or fare used to the destination may differ based on a pickup location, the arrival information 820 may be provided to be verified by the user at a point in time at which the pickup location is set.

Figure 9:
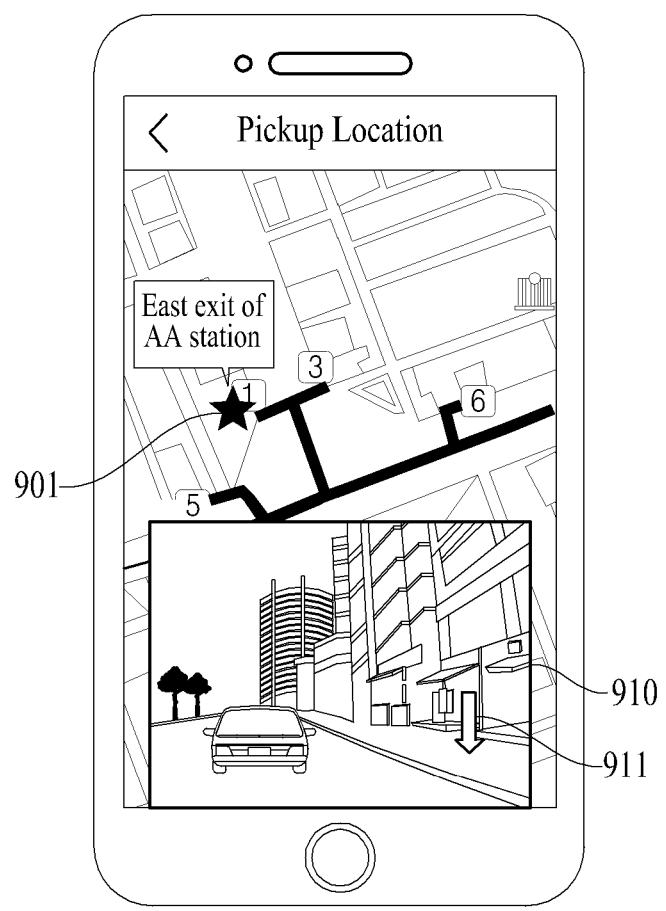

FIG. 9 illustrates an example of pickup request information transferred to a taxi driver terminal according to at least one example embodiment.

Referring to FIG. 9, in response to a pickup request from the user received through the server 150, a map screen of a hot pickup point 901 selected by the user as a pickup location and photo information 910 (e.g., a street photo or an aerial photo) of the hot pickup point 901 may be displayed on a taxi driver terminal. Here, an indicator 911 indicating an actual pickup location may be included in the photo information 910. Differently from an existing scheme of simply guiding a location of a point in a POI level corresponding to the pickup location requested by the user, the hot pickup point 901 provides a detailed location and the photo information 910 of the corresponding point. Thus, a taxi driver may be provided with an exact location of a place for pickup instead of approximate information on a user location.

According to some example embodiments, in response to requesting a pickup service around a large building, for example, a main POI or a landmark, it is possible to select, as a pickup location, a detailed hot pickup point (e.g., a specific pickup location) around the corresponding building and to transfer information on the hot pickup point selected as the pickup location to a server.

Hereinafter, a method of selecting and delivering an exact pickup location of with respect to a road according to another example embodiment will be described.

Key information to request a pickup on a road may be information on a direction on the road to which a pickup location corresponds, for example, a northbound direction or a southbound direction. Unless accurate information is not delivered, a user may need to cross the street to a side where a taxi is to arrive or a taxi driver may need to change a lane.

Herein, proposed is a screen configuration capable of selecting accurate direction information on the road in response to a request for a pickup service around the road.

During a process of generating a DB desired to provide a pickup service, the server 150 may generate in advance a road information DB that stores road information including an attribute or a type of each road, traffic information, and crosswalk and overpass information of each road. In response to an instruction provided from an application executed on the electronic device 110, the processor 212 of the electronic device 110 may download desired data from the server 150 at a setting point in time of a pickup location by referring to a DB that is generated in advance on the server 150, or may download, from the server 150, at least a portion of the data stored in the DB generated in advance on the server 150 and may store the downloaded data in a form of a file on the corresponding application.

The candidate location outputter 310 may provide a map screen that includes a user location, for example, a current location acquired from the electronic device 110 or a location selected by the user. Here, if the user location is on the road or around the road, a UI for selecting a pickup direction based on road information of the corresponding road may be displayed on the map screen.

Figure 10:
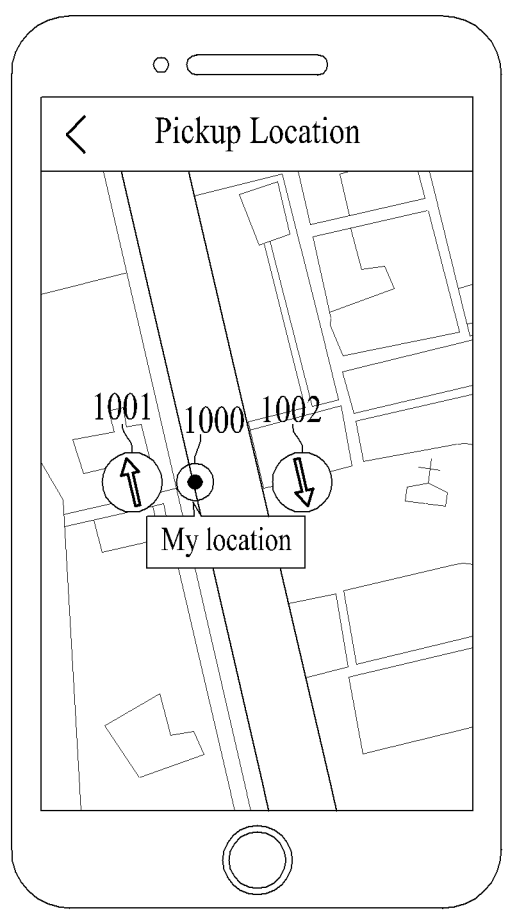
FIGS. 10 through 13 illustrate other examples of a process of selecting a pickup location according to at least one example embodiment.
Figure 11:
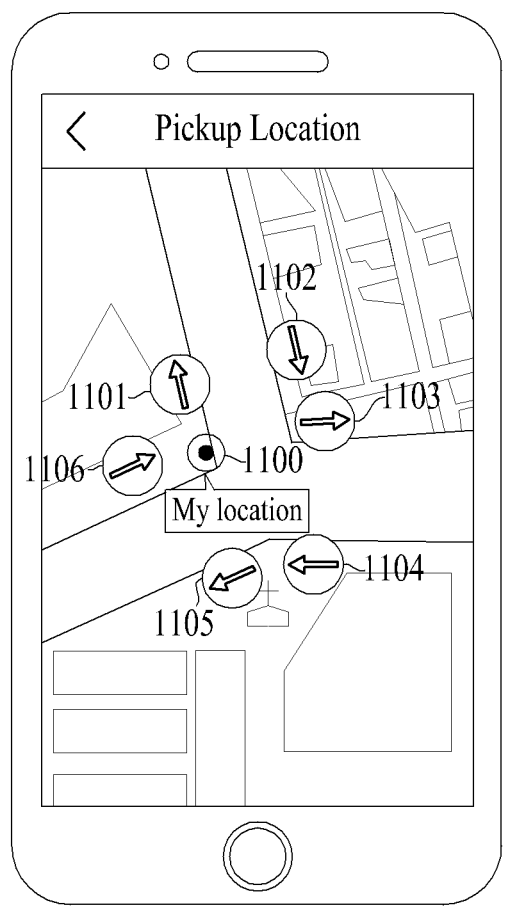

For example, referring to FIG. 10, if a user location 1000 is on the road that allows bi-directional passage, the candidate location outputter 310 may provide a UI capable of selecting one of a southbound direction 1001 or a northbound direction 1002. The candidate location outputter 310 may display a selection UI with respect to all the directions in which passage is allowed based on the user location 1000. As another example, referring to FIG. 11, if a user location 1100 is around an intersection (e.g., a three-way intersection) the candidate location outputter 310 may provide a selection UI with respect to all the directions 1101, 1102, 1103, 1104, 1105, and 1106 in which passage is allowed based on road information of a corresponding location. A direction expressed by an indicator with an arrowhead for each direction may be represented based on a vehicle traveling direction of a country in which the user is present.

Figure 12:
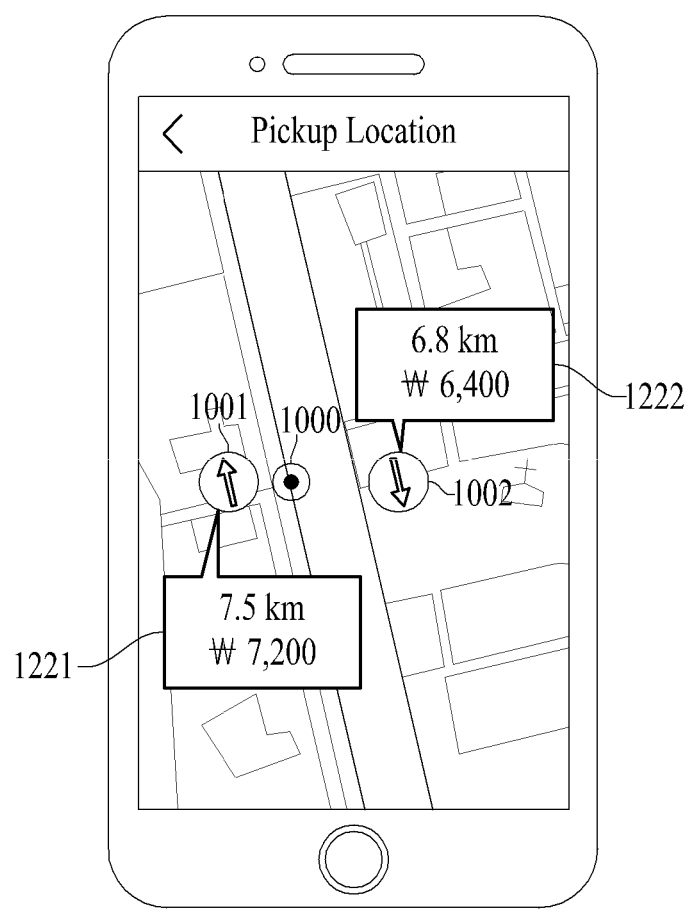

Referring to FIG. 12, the information provider 320 may display, on a map screen, arrival information 1221 on a pickup direction 1001 and arrival information 1222 on a pickup direction 1002 on the road. In some example embodiments, the arrival information 1221 and 1222 may include a distance, an estimated time of arrival, and estimated fare from a corresponding direction to a destination set by a user, for the pickup directions 1001 and 1002, respectively. An amount of time or fare from a corresponding location to the destination may differ based on a pickup direction. Accordingly, the arrival information 1221 and 1222 may be provided to be verified by the user at a point in time at which a pickup location is set.

Also, in response to the user selecting a specific pickup direction, for example, the pickup direction 1002, the information provider 320 may provide guidance information on the pickup direction 1002. Pickup directions on the road may be present on opposite lanes, respectively, and, if desired, the user may need to cross a lane. Accordingly, the information provider 320 may provide a travel distance or route to a location of the pickup direction 1002 based on the user location 1000, and may provide route guidance information that includes crosswalk or overpass information.

Figure 13:
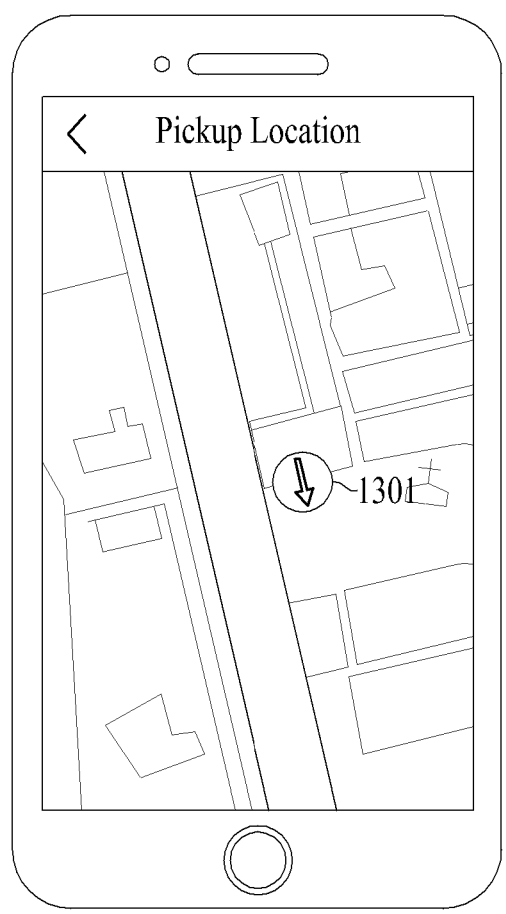

Referring to FIG. 13, if a pickup location requested by the user is on the road, a pickup direction 1301 selected by the user may be displayed on a map screen of a taxi driver terminal, on which the pickup location is displayed in response to the pickup request from the user transferred through the server 150. Accordingly, a taxi driver may easily and clearly verify a location on the road corresponding to a pickup location and a direction on the road corresponding to a pickup location requested by the user.

Accordingly, in response to requesting a pickup service on the road or around the road, it is possible to select and deliver a pickup direction on the corresponding road.

The systems and or apparatuses described herein may be implemented using hardware components, software components, and/or a combination thereof. For example, a processing device may be implemented using one or more general-purpose or special purpose computers such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In some example embodiments, the processing device may be parallel processors, and thus have different processing configurations.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable storage media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable storage media include magnetic media (e.g., hard disks, floppy disks, or magnetic tape); optical media (e.g., CD ROM disks or DVD); magneto-optical media (e.g., floptical disks); and hardware devices (e.g., read-only memory (ROM), random access memory (RAM), or flash memory) that are specially to store and perform program instructions. Examples of program instructions include both machine code produced by, for example, a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular example embodiment, but, where applicable, are interchangeable and can be used in a different example embodiment, even if not specifically shown or described. The disclosed example embodiments may also be varied in many ways. Such variations are not to be regarded as a departure from the disclosure, and all such modifications are intended to be included within the scope of the disclosure.

What is claimed is:

1. A pickup service method executable on a computer system, which includes a memory configured to store computer-readable instructions and at least one processor configured to execute the computer-readable instructions, the pickup service method comprising:
displaying, by the at least one processor, one or more pickup candidate locations corresponding to a location associated with a user of an electronic device, on a map screen including the location;
providing, by the at least one processor, guidance information on a pickup candidate location, which is selected by the user from among the one or more pickup candidate locations, on the map screen;
additionally providing, by the at least one processor, a user interface configured to provide direction information on a corresponding pickup direction on each of both sides of a road or each of a plurality of sides of an intersection for a selection by user and allow the user to select a specific pickup direction, the road or intersection corresponding to the pickup candidate location; and
transmitting, by the at least one processor to a server, a pickup request, the pickup request including a final pickup candidate location that is selected by the user from among the one or more pickup candidate locations displayed on the map screen as a pickup location.

2. The pickup service method of claim 1, wherein the guidance information is provided by referring to a database, which is included in or associated with the server and is configured to store a location and a photo of a desired pickup candidate location around each point of a point of interest (POI) level.

3. The pickup service method of claim 2, wherein the displaying comprises displaying the one or more pickup candidate locations within a desired radius from the location on the map screen by referring to the database.

4. The pickup service method of claim 1, wherein the providing comprises providing photo information of the pickup candidate location as the guidance information on the pickup candidate location.

5. The pickup service method of claim 1, wherein the providing comprises providing route guidance information from the location to the pickup candidate location as the guidance information on the pickup candidate location.

6. The pickup service method of claim 1, further comprising:
providing, by the at least one processor, arrival information from the pickup candidate location to a destination.

7. The pickup service method of claim 1, wherein the additionally providing comprises displaying, by the at least one processor, one or more pickup directions, which corresponds to the road or the intersection on the map screen and are selectable, in response to the location being on or adjacent to the road or the intersection.

8. The pickup service method of claim 7, further comprising:
selecting, by using the user interface, a single direction from among one or more passages allowing directions based on the location and road information on the road, as a pickup direction, the one or more passages being one or more from among the one or more pickup directions that allow passage to the road.

9. The pickup service method of claim 7, further comprising:
providing, by the at least one processor, arrival information to a destination along the specific pickup direction.

10. The pickup service method of claim 7, further comprising:
providing, by the at least one processor, at least one of travel distance or route guidance information from the location to the pickup candidate location along the specific pickup direction.

11. A non-transitory computer-readable storage medium storing instructions that, when executed by a processor, cause computer system to perform the pickup service method of claim 1.

12. A computer system comprising:
a memory configured to store computer-readable instructions; and
at least one processor configured to execute the computer-readable instructions such that the at least one processor is configured to,
display one or more pickup candidate locations corresponding to a location associated with a user of an electronic device, on a map screen including the location,
provide guidance information on a pickup candidate location, which is selected by the user from among the one or more pickup candidate locations, on the map screen,
additionally provide a user interface configured to provide direction information on a corresponding pickup direction on each of both sides of a road or each of a plurality of sides of an intersection for a selection by the user and allow the user to select a specific pickup direction, the road or intersection corresponding to the pickup candidate location, and transmit, to a server, a pickup request, the pickup request including a final pickup candidate location that is selected as a pickup location by the user from among the one or more pickup candidate locations displayed on the map screen.

13. The computer system of claim 12, further comprising:
a database configured to store a location and a photo of a desired pickup candidate location around each point of a point of interest (POI) level,
wherein the at least one processor is configured to provide the guidance information referring to the database.

14. The computer system of claim 13, wherein the at least one processor is configured to display the one or more pickup candidate locations within a desired radius from the location on the map screen by referring to the database.

15. The computer system of claim 12, wherein the at least one processor is configured to provide at least one of photo information of the pickup candidate location or route guidance information from the location to the pickup candidate location as the guidance information on the pickup candidate location.

16. The computer system of claim 12, wherein the at least one processor is configured to provide arrival information from the pickup candidate location to a destination.

17. The computer system of claim 12, wherein the at least one processor is configured to additionally provide the direction information by displaying one or more pickup directions, which corresponds to the road or the intersection on the map screen and are selectable, in response to the location being on or adjacent to the road or the intersection.

18. The computer system of claim 17, wherein the at least one processor is configured to select, by using the user interface, a single direction from among one or more passages allowing directions based on the location and road information on the road, as the specific pickup direction, the one or more passages being one or more from among the one or more pickup directions that allow passage to the road.

19. The computer system of claim 17, wherein the at least one processor is configured to provide arrival information to a destination along the specific pickup direction.

20. The computer system of claim 17, wherein the at least one processor is configured to provide travel distance or route guidance information from the location to the pickup candidate location along the specific pickup direction.

* * * * *